United States Patent
Gupta et al.

(10) Patent No.: US 12,314,698 B2
(45) Date of Patent: May 27, 2025

(54) CLOUD BASED SUBSCRIPTION AND ORCHESTRATION OF CONTINUOUS INTEGRATION AND DEPLOYMENT FOR FIRMWARE

(71) Applicant: American Megatrends International, LLC, Duluth, GA (US)

(72) Inventors: Chitrak Gupta, Kolkata (IN); Venkatesan Balakrishnan, Chennai (IN); Anurag Bhatia, Sugar Hill, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 169 days.

(21) Appl. No.: 18/100,678

(22) Filed: Jan. 24, 2023

(65) Prior Publication Data
US 2024/0248696 A1     Jul. 25, 2024

(51) Int. Cl.
*G06F 9/44*     (2018.01)
*G06F 8/61*     (2018.01)
*G06F 21/57*     (2013.01)

(52) U.S. Cl.
CPC .............. *G06F 8/63* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 10,142,204 B2 * | 11/2018 | Nickolov | G06F 8/65 |
| 10,671,373 B1 * | 6/2020 | Walker | G06F 8/65 |
| 11,281,571 B2 | 3/2022 | Ramachandran et al. | |
| 2019/0378102 A1 * | 12/2019 | Kohli | G06F 9/547 |
| 2020/0285461 A1 * | 9/2020 | Kumar | G06F 8/656 |
| 2021/0117249 A1 | 4/2021 | Doshi et al. | |
| 2021/0334195 A1 * | 10/2021 | Sethi | G06F 8/65 |

* cited by examiner

*Primary Examiner* — Qamrun Nahar
(74) *Attorney, Agent, or Firm* — TROUTMAN PEPPER LOCKE LLP; Tim Tingkang Xia, Esq.

(57) ABSTRACT

In an aspect of the disclosure, a method, a computer-readable medium, and a computer system are provided. The computer system includes one or more computing devices. The one or more computing devices provide access to a first firmware image containing firmware of a baseboard management controller (BMC) through a cloud platform. The one or more computing devices receive, from a first device of a first subscriber, a request to retrieve the first firmware image according to a first subscription. The one or more computing devices grant, to the first device, access to the first firmware image.

17 Claims, 7 Drawing Sheets

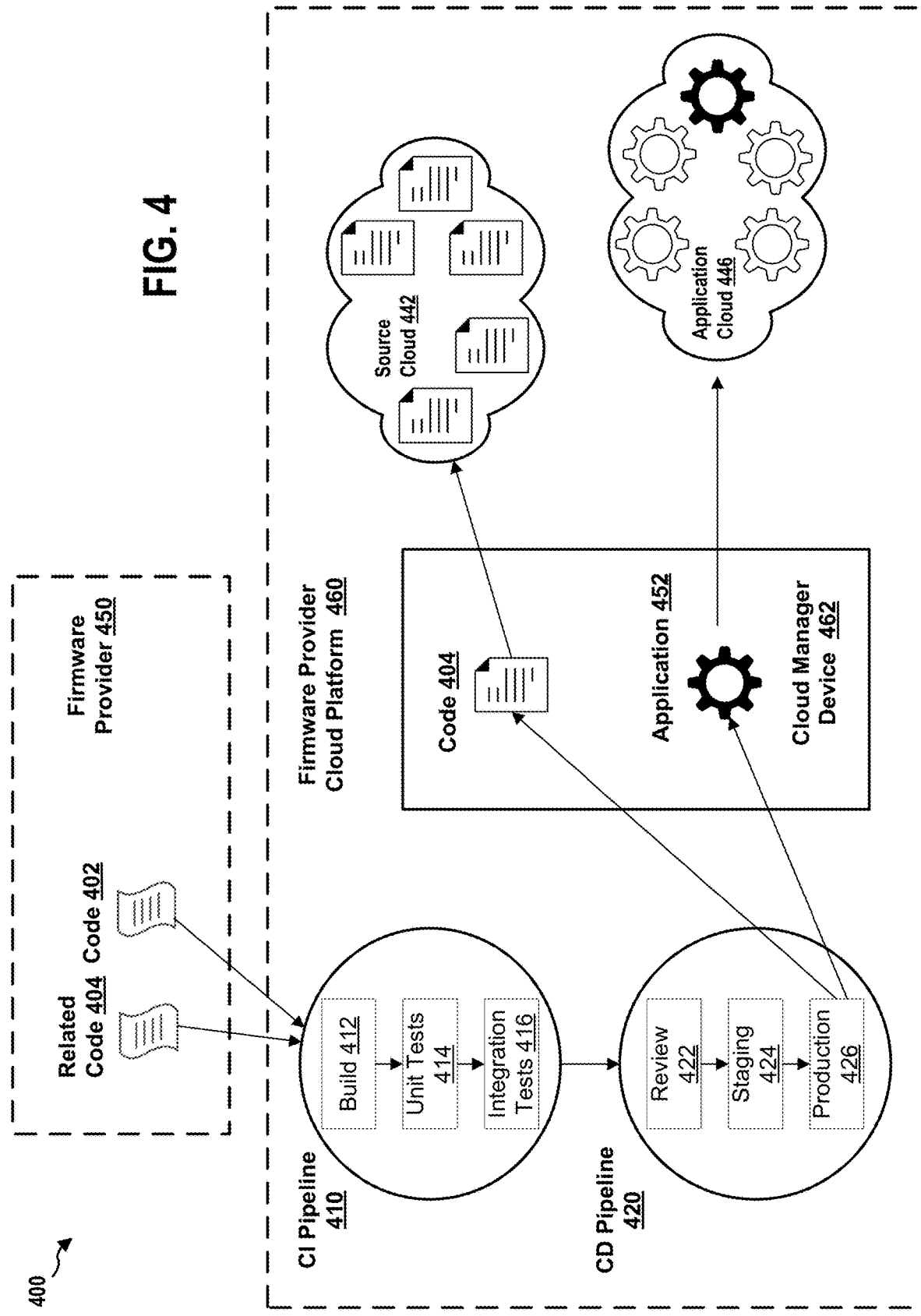

CLOUD BASED SUBSCRIPTION AND ORCHESTRATION OF CONTINUOUS INTEGRATION AND DEPLOYMENT FOR FIRMWARE

BACKGROUND

Field

The present disclosure relates generally to computer systems, and more particularly, to techniques of methodology for updating of BMC firmware and applications.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes one or more computing devices. The one or more computing devices provide access to a first firmware image containing firmware of a baseboard management controller (BMC) through a cloud platform. The one or more computing devices receive, from a first device of a first subscriber, a request to retrieve the first firmware image according to a first subscription. The one or more computing devices grant, to the first device, access to the first firmware image.

In another aspect of the disclosure, a method, a computer-readable medium, and a computer system are provided. The computer system includes one or more computing devices. The one or more computing devices authenticate a subscription with a cloud platform. The one or more computing devices request the firmware image from the cloud platform in accordance with the subscription. The one or more computing devices deploy the firmware image to one or more BMCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating a process for developing firmware components.

DETAILED DESCRIPTION

Figure 1:
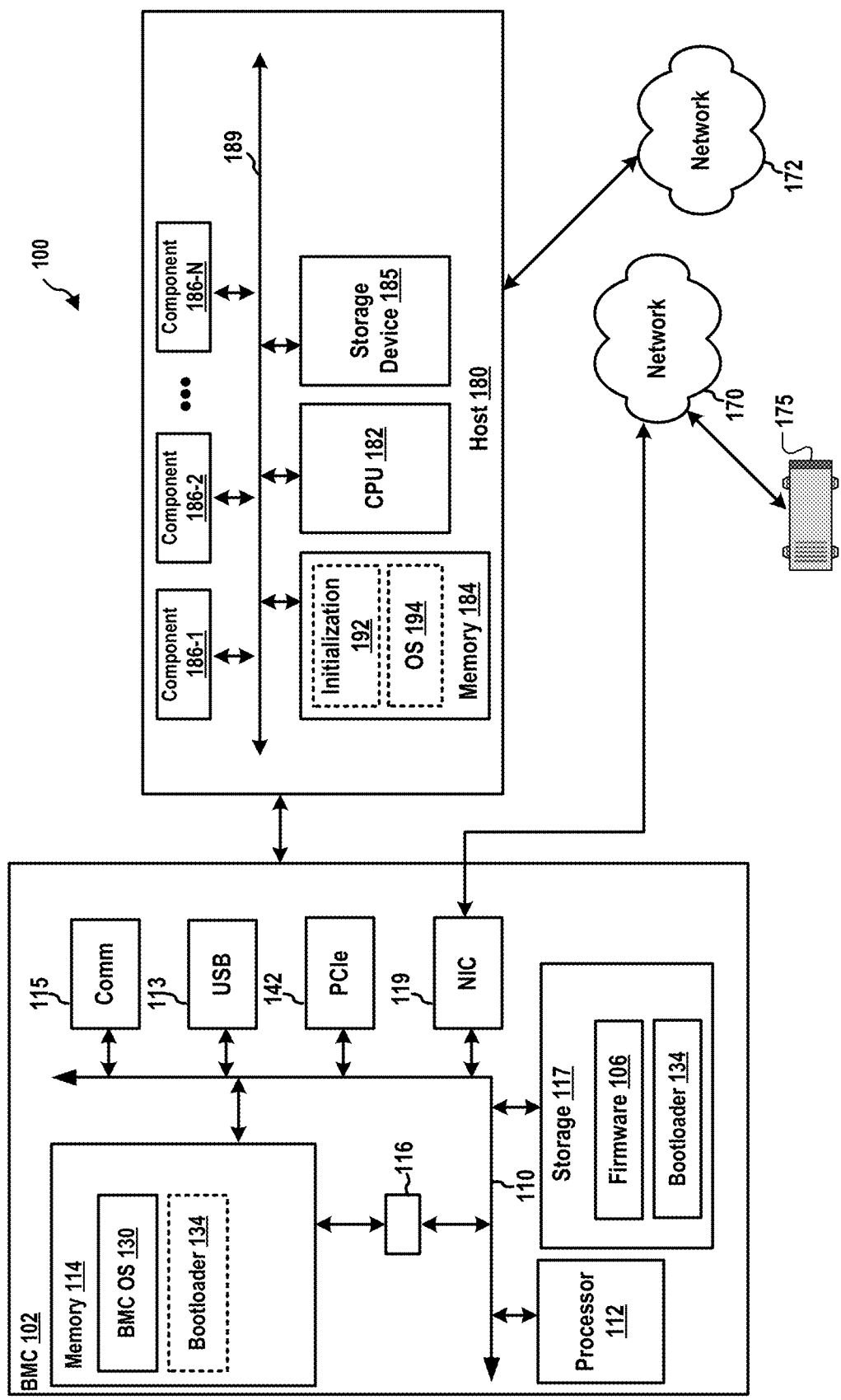
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a Universal Serial Bus (USB) interface 113, a PCIe port 142, and other communication interfaces 115.

The communication interfaces 115 may include a keyboard controller style (KCS), a server management interface chip (SMIC), a block transfer (BT) interface, a system management bus system interface (SSIF), an inter-integrated circuit ($i^2c$) interface, and/or other suitable communication interface(s).

Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store a BMC firmware image 106 and a bootloader 134 in the storage 117. In certain configurations, the bootloader 134 may be part of the BMC firmware image 106. The storage 117 may utilize one or more non-volatile, non-transitory storage media. After power on or rest, the processing unit 112 executes the bootloader 134. The bootloader 134 loads code and data of the BMC firmware image 106 into the memory 114. In particular, the BMC firmware image 106 can provide in the memory 114 a BMC OS 130 (operating system) as well as various applications and services. After the boot process, the bootloader 134 transfers the control to the BMC OS 130. As such, the BMC firmware image 106 can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, component devices 186-1 to 186-N etc. Those component devices can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, those component devices can include hardware components of a computer 602 shown in FIG. 6. Each component is connected to a system bus 189 of the host computer 180.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
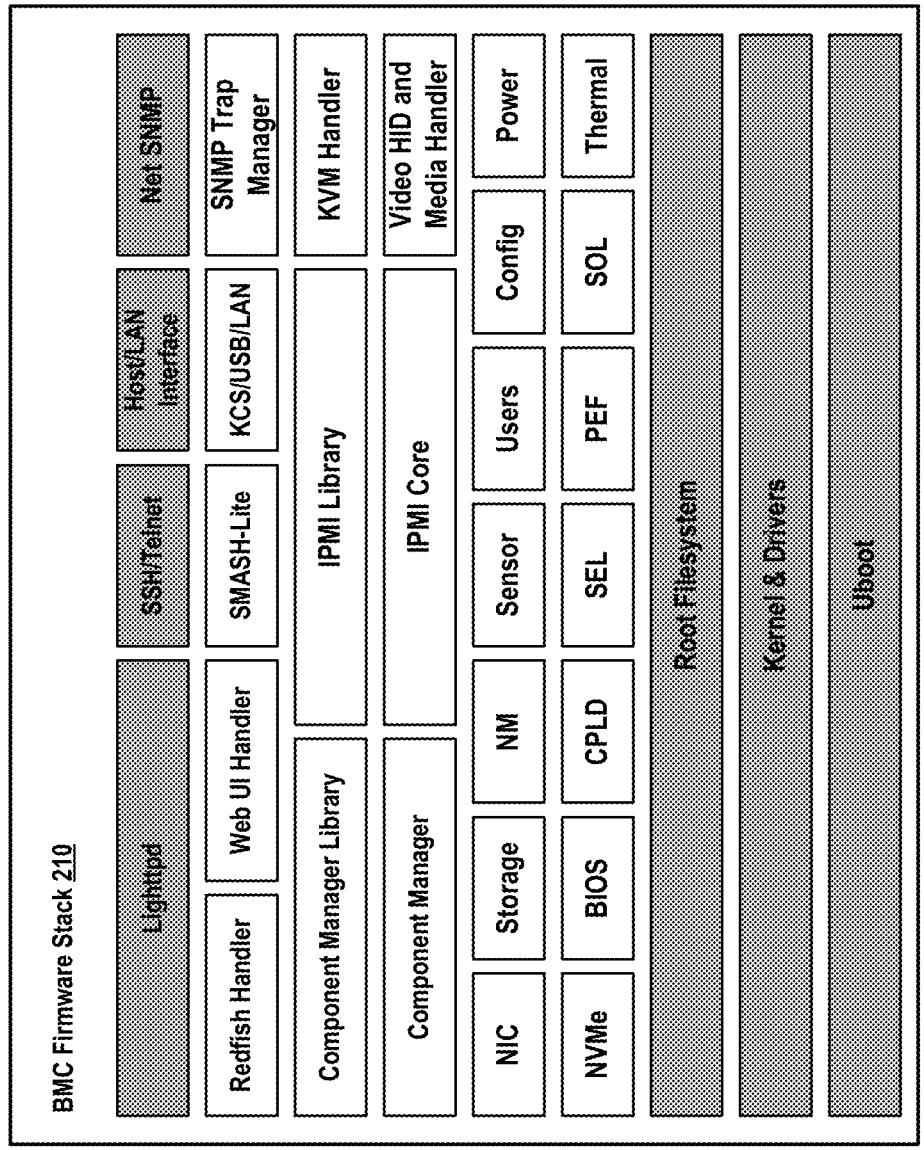
FIG. 2 is a diagram illustrating a firmware stack.

FIG. 2 is a diagram 200 illustrating a firmware stack 210 of the components of the BMC firmware image 106. More specially, the firmware stack 210 may contain components of one or more of U-Boot, kernel, drivers, root filesystem, lighttpd, SSH/telnet, host/LAN interface and net SNMP, etc. The firmware stack 210 may also contain applications and libraries for Network Interface Card (NIC), non-volatile memory express (NVMe), Storage, BIOS, NM, complex programmable logic device (CPLD), sensor, platform event filtering (PEF), serial over LAN (SOL), system event logs (SOL), thermal, power, config, users, component manager, component manager library, IPMI core, IPMI core library, SNMP trap manager, SMASH-lite, KCS/USB/LAN, KVM handler, video HID and media handler, redfish handler and web UI handler.

Figure 3A:
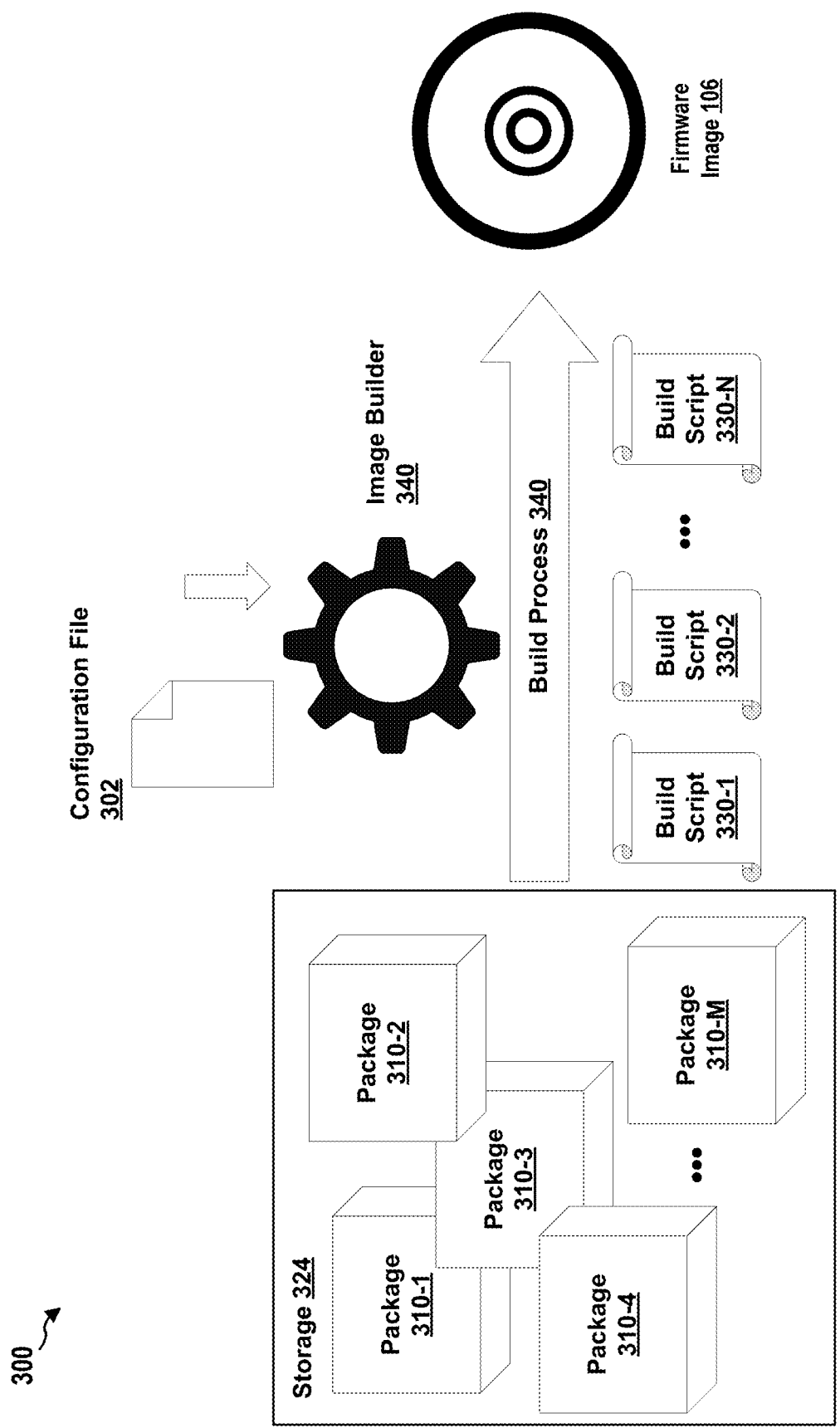
FIG. 3(A) is a diagram illustrating procedures for generating a BMC firmware image.

FIG. 3(A) is a diagram 300 illustrating procedures for generating a BMC firmware image 106. A storage 324 may provide source packages 310-1 to 310-M to an image builder 340. Each source package includes various source files that can be complied by the image builder 340 to generate binary files. The image builder 340 runs multiple build script 330-1 to 330-N. Each build script, according to a configuration file 302, instruct the image builder 340 to a build one or more components of the BMC firmware image 106. The image builder 340 then combines all the components together to generate a monolithic BMC firmware image 106. According to different configurations of the configuration file 302, the BMC firmware image 106 being built by the image builder 340 may contain different layers of components.

Figure 3B:
FIG. 3(B) is a diagram illustrating layers of components that can be included in the BMC firmware image.

FIG. 3(B) is a diagram 350 illustrating layers of components that can be included in the BMC firmware image 106 by the image builder 340. In general, the BMC firmware image 106 includes a layer 1 components 370-1, which form the base BMC firmware. More specifically, the layer 1 components 370-1 may contain a bootloader, a kernel, device drivers, a root file system, a board support package (BSP), and components supporting essential or standard BMC functionalities such as IPMI. The layer 1 components 370-1 may also contain an application installation component 372. As described infra, when the BMC 102 is running the system provided by the BMC firmware image 106, the application installation component 372 can retrieve additional components from a cloud system and install the retrieved component on the BMC 102.

Additional layer of components may be added to the BMC firmware image 106 based on an access privilege a customer. For example, a layer 2 components 370-2 may be available to customers with a professional subscription or an enterprise subscription of services. A layer 3 components 370-3 may be only available to customers with an enterprise subscription. More specifically, the layer 2 components 370-2 may include a set of specialized applications such as remote debugging. The layer 3 components 370-3 may include another set of specialized applications such as media redirection.

FIG. 4 is diagram 400 illustrating a process for developing firmware components. A firmware provider 450 provides a firmware provider cloud platform 460 that can be accessed by customers. The firmware provider cloud platform 460 includes a continuous integration (CI) pipeline 410, a continuous delivery (CD) pipeline 420, a source cloud 442, an application cloud 446.

In one example, the firmware provider 450 may create code 402 for an application 452, which is a new application or an updated application. The firmware provider 450 commits the code 402 and relevant code 404 into the CI pipeline 410. The CI pipeline 410 is focused on automating the process of integrating code changes from multiple developers into a single codebase. This process typically includes building the software, running automated tests, and checking for code quality issues.

In this example, the CI pipeline 410 includes a build stage 412, a unit tests stage 414, and an integration tests stage 416. In the build stage 412, the code 402 and the relevant code 404 are compiled into the application 452, which is executable/runnable. In the unit tests stage 414, each individual units of the code 402 such as functions, modules, or a set of processes are tested. Once that each unit of the code is functioning properly has been proven, in the integration tests stage 416, the integration between different components or subsystems of the firmware is tested.

The CI pipeline 410 is followed by a continuous delivery (CD) pipeline 420 which includes a review phase 422, a staging phase 424 and a production phase 426. In the review phase 422, the code 402 is reviewed and approved to the codebase (e.g., the source cloud 442) before the application 452 is deployed to production. In the staging phase 424, the application 452 is deployed to a staging environment that closely mirrors the production environment. The staging environment is used to test the application 452 in a production-like setting before the application 452 are deployed to the production environment. In the production phase 426, the application 452 is delivered to the application cloud 446 through a cloud manager device 462. Further, the code 402 is delivered to the source cloud 442 through the cloud manager device 462.

Figure 5:
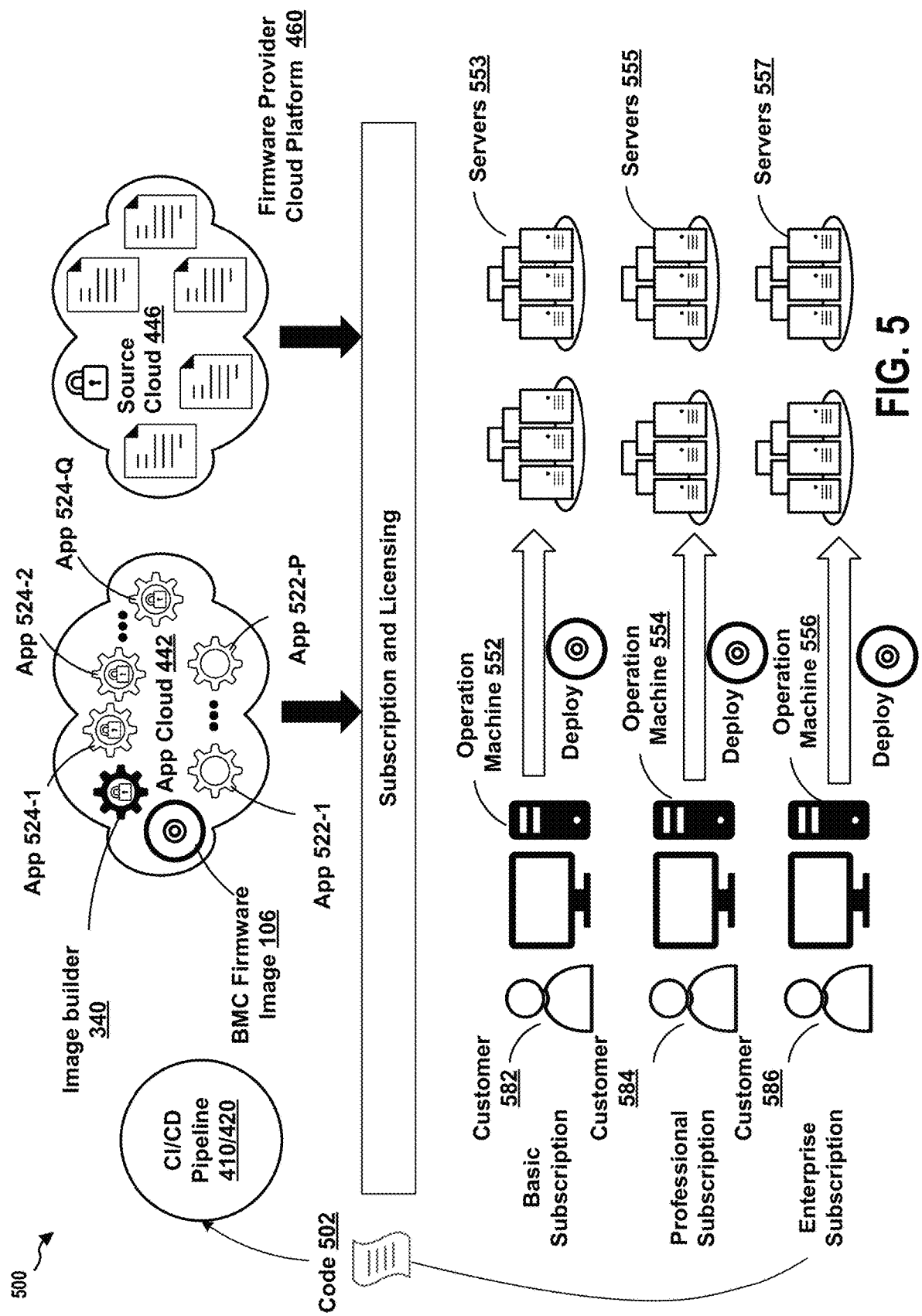
FIG. 5 is a diagram 500 illustrating a subscription based model for distributing BMC firmware.

FIG. 5 is a diagram 500 illustrating a subscription based model for distributing BMC firmware. In this example, the firmware provider 450 have customers 582, 584, 586. More specifically, the customer 582 may have a level 1 subscription (e.g., a basic subscription). The customer 584 may have a level 2 subscription (e.g., a professional subscription). The customer 586 may have a level 3 subscription (e.g., an enterprise subscription).

Different levels of subscriptions provide different levels of accesses to the applications in the application cloud 446. For example, the level 1 subscription may only allow a subscriber to access a base BMC firmware image 106 and level 2 applications 522-1 to 522-P. The level 2 subscription allows a subscriber to access level 2 applications 524-1 to 524-Q and everything that can be accessed by a level 1 subscriber. The level 3 subscription allows a subscriber to access the image builder 340, which is also included in the application cloud 446, as well as the source cloud 442. Further, the level subscription also allows a subscriber to access the CI/CD pipelines 410, 420 through the firmware provider cloud platform 460.

In one example, the customer 582, who has a level 1 subscription, operates an operation machine 552. The operation machine 552 was granted permission to access the base BMC firmware image 106 and the applications 522-1 to 522-P. Accordingly, in certain configurations, the operation machine 552 retrieves the base BMC firmware image 106 from the application cloud 446. Subsequently, the operation machine 552 deploys the base BMC firmware image 106 to servers 553 of the customer 582. Each server may be a combination of a BMC 102 and a host computer 180. The base BMC firmware image 106 is deployed to a BMC 102. The operation machine 552 also deploys various application configurations to the servers 553. As described supra, the base BMC firmware image 106 contains the application installation component 372. Each server, after booting up from the base BMC firmware image 106, may execute the application installation component 372. The application installation component 372 may, based on the application configurations deployed to that particular server, retrieve and install one or more applications 522-1 to 522-P. The base BMC firmware image 106 and the applications 522-1 to 522-P in the application cloud 446 are continuous updated or expanded. The firmware provider 450 may inform the customer 582 regarding the updates. Accordingly, the operation machine 552 may retrieve the updated base BMC firmware image 106 from the application cloud 446 and deploy that image to the servers 553.

The level 1 subscription allows its subscriber to purchase, at additional costs, applications that are not included in the subscription and to purchase the source files from the source cloud 442.

In one example, the customer 584, who has a level 2 subscription, operates an operation machine 554 and servers 555. Similar to what was described supra regarding the operation machine 552, the operation machine 554 was granted permission to access the base BMC firmware image 106 and the applications 522-1 to 522-P. Further, the operation machine 554 can also access the level 2 applications 524-1 to 524-Q. In addition, the customer 584 may request the firmware provider 450 to produce a customized BMC firmware image 106 that contains one or more of the applications. The operation machine 554 may retrieve the customized BMC firmware image 106 from the application cloud 446 and deploy that image to the servers 555. The servers 555 may, based on the configurations, retrieve additional applications from the application cloud 446 and install them.

The level 2 subscription allows its subscriber to purchase, at additional costs, applications that are not included in the subscription and to purchase the source files from the source cloud 442.

In one example, the customer 586, who has a level 3 subscription, operates an operation machine 556 and servers 557. Similar to what was described supra regarding the operation machine 554, the operation machine 556 was granted permission to access the base BMC firmware image 106, the customized BMC firmware image 106, and the level 1 applications 522-1 to 522-P, and the level 2 applications 524-1 to 524-Q.

In addition, the operation machine 556 may access the CI/CD pipelines 410, 420 and the image builder 340 in the firmware provider cloud platform 460. The operation machine 556 may instruct the image builder 340 to build a customized BMC firmware image 106 accordingly to a particular specification. Based on the particular specification, the image builder 340 may obtain the relevant source (code or binaries) from the source cloud 442 and build the requested customized BMC firmware image 106.

Further, the customer 586 may generate customer code 502 and use the operation machine 556 to submit the customer code 502 to the CI/CD pipelines 410, 420, which is made accessible to the operation machine 556 through the firmware provider cloud platform 460. Through the CI/CD pipelines 410, 420, as described supra regarding FIG. 4, the customer code 502 can be approved and delivered to the source cloud 442 through the cloud manager device 462. An application generated with the customer code 502 can be approved and delivered to the application cloud 446. Further, the application generated may be made available to other customers (e.g., the customer 582 and the customer 584) through the firmware provider cloud platform 460 according to certain agreements.

Each application in the application cloud 446 needs to be signed with a certificate for it to be installed run time on a server. The signing service will be hosted in the firmware provider cloud platform 460. Customer certificates can also be hosted, which enables customers to have their signed images and to deploy them on the servers.

In certain scenarios, customers can download sources, customize the sources, and then build deployable images with the sources. The responsibility of verifying the functionalities of the image may reside with the customers. The firmware provider 450 can provide support based on agreement. Customers may download build SDK customize their sources.

Figure 6:
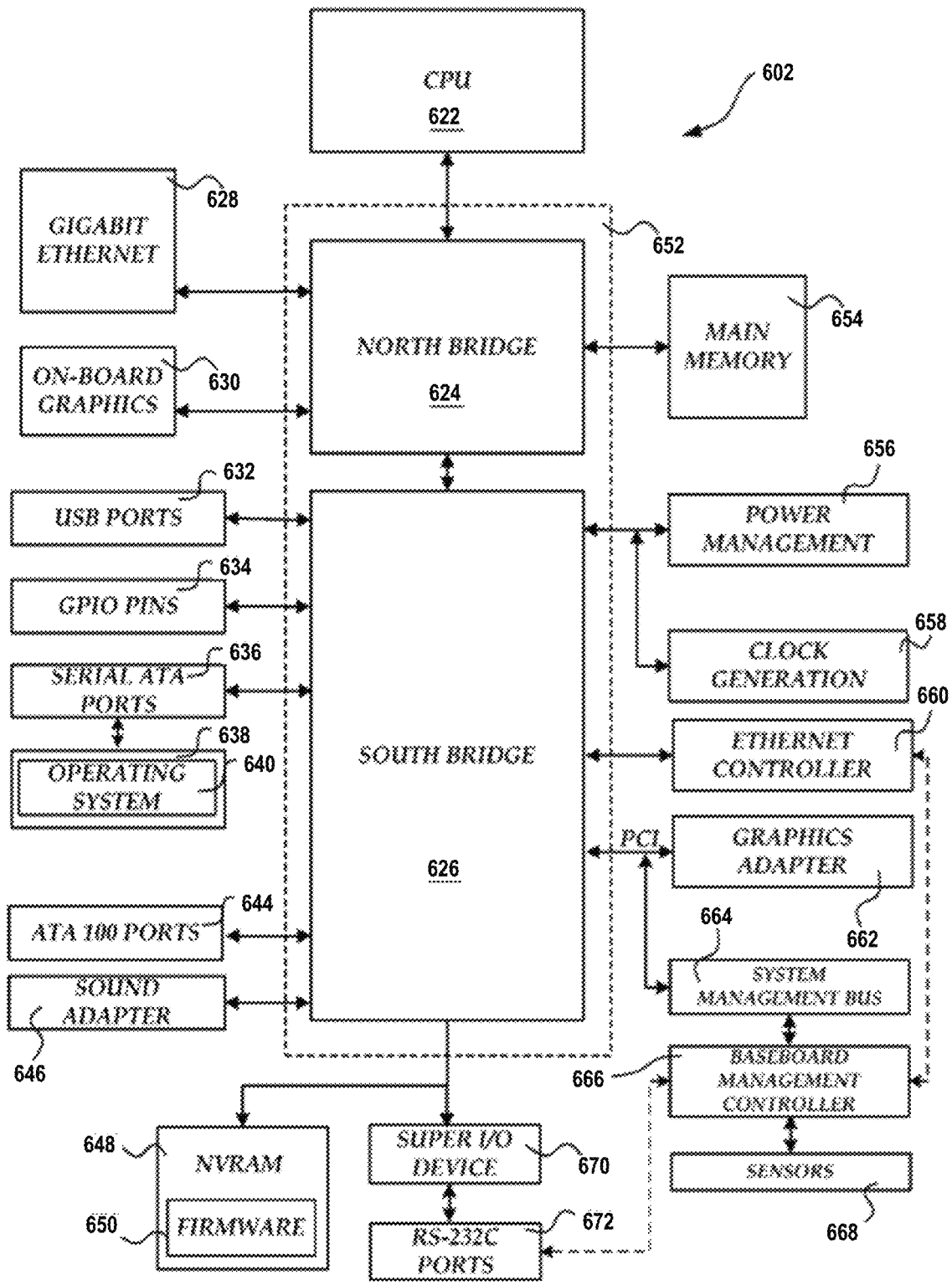
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 840 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary." is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method, implemented by one or more computing devices, of operating a cloud platform, comprising:
   providing access to a first firmware image containing firmware through the cloud platform;
   receiving, from a first device of a first subscriber, a request to retrieve the first firmware image according to a first subscription;
   granting, to the first device, access to the first firmware image;
   receiving, from a development process, a first component of the firmware;
   providing access to the first component through the cloud platform;
   receiving, from a baseboard management controller (BMC) of the first subscriber executing the firmware, a request to retrieve the first component according to the first subscription, wherein the first component running on the firmware; and
   granting, to the BMC, access to the first component.

2. The method of claim 1, further comprising:
   implementing the development process in the cloud platform;
   receiving, from the development process, code for generating the first component; and
   providing access to the code through the cloud platform.

3. The method of claim 2, wherein the code is received from a device of the first subscriber.

4. The method of claim 2, wherein the development process includes continuous integration and continuous delivery (CI/CD) pipelines, wherein the code and the first component have been approved through the CI/CD pipelines.

5. The method of claim 1, further comprising:
   implementing, in the cloud platform, a build process that builds a firmware image;
   receiving, from a second device of a second subscriber of a second subscription, a request for building a second firmware image containing a customized firmware according to a specification, the second firmware image contains at least one component that is not in the first firmware image;
   retrieving, in the build process and from the cloud platform, one or more source files specified in the specification;
   building the second firmware image with the one or more source files in the build process; and
   providing access to the second firmware image through the cloud platform.

6. The method of claim 5, further comprising:
   receiving, from a device of the second subscriber, a request to retrieve the second firmware image according to the second subscription; and
   granting, to the device of the second subscriber, access to the second firmware image.

7. A method, implemented by one or more computing devices, of deploying a firmware image, comprising:
   authenticating a subscription with a cloud platform;
   sending, to the cloud platform, a request for building the firmware image according to a specification;
   requesting the firmware image from the cloud platform in accordance with the subscription; and
   deploying the firmware image to one or more baseboard management controllers (BMCs).

8. The method of claim 7, further comprising:
   configuring the one or more BMCs executing firmware contained in the firmware image to retrieve one or more components from the cloud platform according to the subscription, the one or more components running on the firmware.

9. The method of claim 7, wherein the specification specifies one or more source files provided in the cloud platform to be used for building the firmware image.

10. The method of claim 7, further comprising:
submitting code to the cloud platform for generating a first component;
detecting that the first component is accessible through the cloud platform; and
configuring the one or more BMCs to retrieve the first component from the cloud platform.

11. The method of claim 10, wherein the code is submitted to continuous integration and continuous delivery (CI/CD) pipelines implemented in the cloud platform.

12. An apparatus, the apparatus being one or more computing devices, comprising:
a first memory; and
at least one processor coupled to the first memory and configured to:
provide access to a first firmware image containing firmware through a cloud platform;
receive, from a first device of a first subscriber, a request to retrieve the first firmware image according to a first subscription;
grant, to the first device, access to the first firmware image;
receive, from a development process, a first component of the firmware;
provide access to the first component through the cloud platform; and
receive, from a baseboard management controller (BMC) of the first subscriber executing the firmware, a request to retrieve the first component according to the first subscription, wherein the first component running on the firmware; and
grant, to the BMC, access to the first component.

13. The apparatus of claim 12, wherein the at least one processor is further configured to:
implement the development process in the cloud platform;
receive, from the development process, code for generating the first component; and
provide access to the code through the cloud platform.

14. The apparatus of claim 13, wherein the code is received from a device of the first subscriber.

15. The apparatus of claim 13, wherein the development process includes continuous integration and continuous delivery (CI/CD) pipelines, wherein the code and the first component have been approved through the CI/CD pipelines.

16. The apparatus of claim 12, wherein the at least one processor is further configured to:
implement, in the cloud platform, a build process that builds a firmware image;
receive, from a second device of a second subscriber of a second subscription, a request for building a second firmware image containing a customized firmware according to a specification, the second firmware image contains at least one component that is not in the first firmware image;
retrieve, in the build process and from the cloud platform, one or more source files specified in the specification;
build the second firmware image with the one or more source files in the build process; and
provide access to the second firmware image through the cloud platform.

17. The apparatus of claim 16, wherein the at least one processor is further configured to:
receive, from a device of the second subscriber, a request to retrieve the second firmware image according to the second subscription; and
grant, to the device of the second subscriber, access to the second firmware image.

* * * * *